US012159540B2

(12) United States Patent
Schwindt

(10) Patent No.: US 12,159,540 B2
(45) Date of Patent: Dec. 3, 2024

(54) METHOD AND SYSTEM FOR UPDATING A FLIGHT PLAN

(71) Applicant: GE Aviation Systems Limited, Gloucestershire (GB)

(72) Inventor: Stefan Schwindt, Cheltenham (GB)

(73) Assignee: GE Aviation Systems Limited, Cheltenham (GB)

( * ) Notice: Subject to any disclaimer, the term of this patent is extended or adjusted under 35 U.S.C. 154(b) by 231 days.

(21) Appl. No.: 17/718,855

(22) Filed: Apr. 12, 2022

(65) Prior Publication Data

US 2022/0343772 A1 Oct. 27, 2022

(30) Foreign Application Priority Data

Apr. 26, 2021 (EP) .................................... 21170565

(51) Int. Cl.
*G08G 5/00* (2006.01)

(52) U.S. Cl.
CPC ......... *G08G 5/0039* (2013.01); *G08G 5/0013* (2013.01); *G08G 5/0021* (2013.01)

(58) Field of Classification Search
CPC .. G08G 5/0039; G08G 5/0013; G08G 5/0021; G08G 5/003
See application file for complete search history.

(56) References Cited

U.S. PATENT DOCUMENTS 6,643,580 B1 11/2003 Naimer
9,607,521 B2 3/2017 Coulmeau et al.
9,697,737 B2 7/2017 Hale et al.
2004/0111192 A1 6/2004 Naimer
2014/0257683 A1 9/2014 Choi et al.
2018/0182250 A1 6/2018 Bonnet et al.
2018/0366010 A1* 12/2018 Agam .................. G08G 5/0034
2019/0202555 A1 7/2019 Taipale
2020/0168104 A1 5/2020 Holder et al.
2020/0193841 A1 6/2020 D'Alto et al.
(Continued)

FOREIGN PATENT DOCUMENTS

CA 2796981 A1 * 10/2011 ............. G08G 5/003
CN 103699490 A 4/2014
CN 111081074 A 4/2020
(Continued)

*Primary Examiner* — Michael J Zanelli
(74) *Attorney, Agent, or Firm* — McGarry Bair PC

(57) ABSTRACT

A method for validating, with a first computing device onboard an aircraft, a flight plan having a set of first flight parameters comprising respective first values, loaded onto the first computing device of an aircraft includes receiving from a second source, by the first computing device, data comprising a set of second flight parameters having respective second values corresponding to the set of first flight parameters. The method includes comparing the first values of the set of first flight parameters to the second values of the corresponding set of second flight parameters by the first computing device, determining, whether an implausible condition exists. When an implausible condition is determined, the method includes automatically displaying a first notification on a display device in the aircraft, requesting a modification to the set of first flight parameters, and receiving a modification to the loaded flight plan based on the notification.

18 Claims, 3 Drawing Sheets

(56) References Cited

U.S. PATENT DOCUMENTS

| | | | |
|---|---|---|---|
| 2020/0312158 | A1 | 10/2020 | Shamasundar et al. |
| 2020/0320884 | A1 | 10/2020 | Hillier et al. |

FOREIGN PATENT DOCUMENTS

| | | | | | |
|---|---|---|---|---|---|
| CN | 112133137 | A | | 12/2020 | |
| EP | 3401893 | A1 | | 11/2018 | |
| EP | 3680689 | A1 | * | 7/2020 | ............. B64F 1/002 |
| FR | 3023911 | A1 | * | 1/2016 | ............ B64D 45/00 |

* cited by examiner

METHOD AND SYSTEM FOR UPDATING A FLIGHT PLAN

CROSS REFERENCE TO RELATED APPLICATION(S)

This application claims priority to and benefit of EP Patent Application No. 21170565.2 filed Apr. 26, 2021, which is incorporated herein in its entirety.

TECHNICAL FIELD

This disclosure relates generally to validating a flight plan.

BACKGROUND

Air traffic management is increasingly being modernized to leverage emerging technologies and aircraft navigation capabilities. Aircraft can exploit the high accuracy provided by Global Navigation Satellite System (GNSS) and Global Positioning System (GPS)-based navigation systems, modern Flight Management Systems (FMSs) and Flight Control Systems (FCSs) and can be operated according to a flight plan loaded on or through the FMS.

BRIEF DESCRIPTION

An aspect of the present disclosure relates to a method for validating, with a first computing device onboard an aircraft, a flight plan having a set of first flight parameters comprising respective first values. The method includes receiving the flight plan into the first computing device to define a loaded flight plan; receiving, by the first computing device, from a second source remote from the aircraft, a set of data comprising a set of second flight parameters having respective second values and corresponding to the set of first flight parameters; comparing the respective first values of the set of first flight parameters in the loaded flight plan to the respective second values of the corresponding set of second flight parameters by the first computing device; determining, based on the comparing, whether an implausible condition exists with respect to the loaded flight plan; and when an implausible condition is determined, automatically displaying a first notification on a display device; requesting, by the first computing device, a modification to the set of first flight parameters; and receiving a modification to the loaded flight plan in response to the notification.

In another aspect, the disclosure relates to a system adapted to verify a flight plan. The system includes a first computing device onboard the aircraft; a display device communicatively coupled to the first computing device; the first computing device configured to: receive the flight plan; receive, from a second source remote from the aircraft, a set of data comprising a set of second flight parameters having respective second values and corresponding to the set of first flight parameters; compare the respective first values of set of first flight parameters to the respective second values of the corresponding set of second flight parameters by the first computing device; determine, based on the comparing, whether an implausible condition exists with respect to the received flight plan; and when an implausible condition is determined, display a first notification on the display device; request a modification to the set of first flight parameters; and receive a modification to the set of first flight parameters based on the first notification.

BRIEF DESCRIPTION OF THE DRAWINGS

A full and enabling disclosure of the present description, including the best mode thereof, directed to one of ordinary skill in the art, is set forth in the specification, which refers to the appended FIGS., in which.

DETAILED DESCRIPTION

Figure 1:
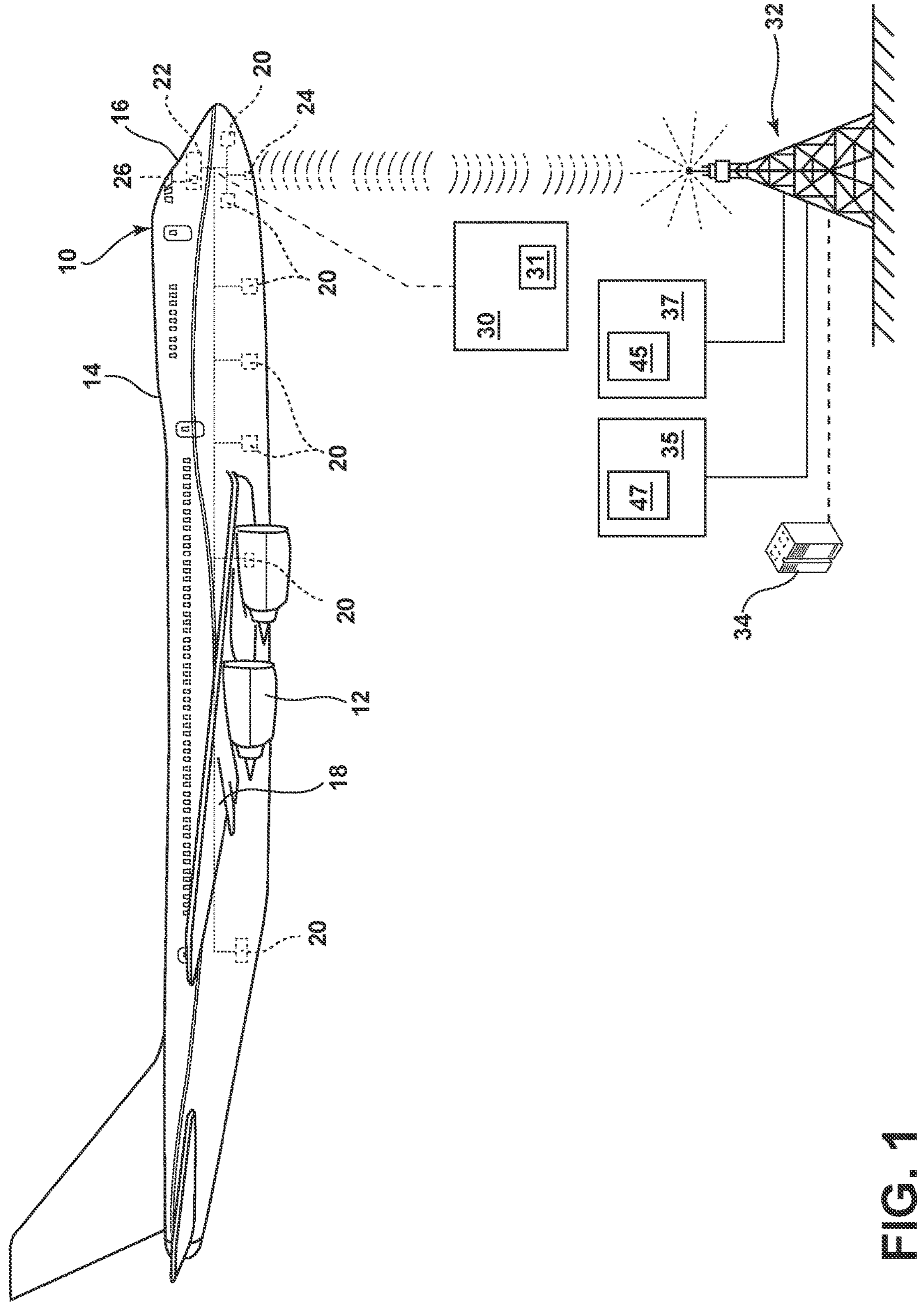
FIG. 1 is a schematic illustration of an aircraft and ground system according to aspects described herein.

A conventional flight plan is a record prepared by a pilot, a flight dispatcher, an air traffic controller, or any other aviation authority prior to an intended flight of an aircraft that provides important information about the flight. The aircraft can then be flown or operated according to the flight plan. Each flight plan can include a corresponding set of any number of flight parameters. As used herein, the term "flight parameters" can refer to discrete numerical or objective factors or data that can collectively define the flight plan. For example, a flight plan for a commercial aircraft for an airline can include a set of flight parameters that can comprise, without limitation, one or more of a trajectory, (such as a 3-dimensional or 4-dimensional trajectory), an altitude, a flight level, an airspeed, a climb rate, a descent rate, a waypoint, a checkpoint, an airport, a turn radius, a fuel level, an airline, an airline flight number, an aircraft identification number, an aircraft type, a departure date, a departure or origin airport, a departure gate or jetway, a destination airport, an arrival gate or jetway, a departure time, an estimated time to complete the flight, an arrival time, a listing of alternate airports (e.g., for use in the event of bad weather), the pilot's name, a number of passengers onboard, and combinations thereof.

Additionally, conventional aircraft are often equipped with an avionics device or computerized navigational aid system called a Flight Management System (FMS). The FMS can exchange a variety of information with the ground and with other equipment on the aircraft. The FMS can communicate with the crew of the aircraft via man-machine interfaces. The flight management system helps the pilot in programming the flight plan before take-off and in following the flight path indicated by the flight plan from take-off through to landing.

Typically, the flight plan for a particular flight is prepared several hours before take-off by the pilot or other airline personnel. When the flight plan is prepared, the pilot or flight crew can input, store, or otherwise load the flight plan into the FMS of the aircraft. Alternatively, flight plan can be received by the FMS from an external source such as, but not limited to an Air Traffic Control (ATC), an Electronic Flight Bag (EFB), an Aircraft Communications Addressing and Reporting System (ACARS), an Airline Operations Center (AOC) or any combination thereof. Additionally, the pilot can provide a copy of the flight plan to an air traffic control ground station or other aviation authority prior to flight. The air traffic control ground station can typically communicate with the aircraft by a datalink (e.g., Controller to Pilot Data Link communication or "ATC CPDLC Uplink"), and can further dispatch digital clearances, using standardized messages (e.g., "ATC Uplinks"). The clearances are received by a Communication Management Unit ("CMU") or other communication link onboard the aircraft, and can be viewable on a dedicated display or graphical user interface (GUI). The pilot can then accept the clearances from the CMU and, if necessary, update the flight plan loaded in the FMS to incorporate the clearances. The FMS can send the updated flight plan back to the air traffic control ground station, for example by a conventional Automatic Dependent Surveillance system ("ADS"), which can exchange position and movement information between aircraft deploying in close vicinity to one another or between an aircraft and a ground control station.

However, in some instances, a pilot or flight crew can load an incorrect or invalid flight plan into the FMS of the aircraft due to an error (e.g. human error) prior to departure from a jetway. For example, the error can result from the pilot unintentionally selecting a wrong flight plan to load into the FMS or from the pilot making an incorrect entry, such as a typographical error, when loading or updating the flight plan. In other instances, the error can result from an airline inadvertently providing a wrong flight plan to the pilot to begin with. In still other instances the error can result from the flight plan being based on an incorrect aircraft type, or based on erroneous information provided to a stand display for docking the aircraft. Such erroneous or invalid flight plans may include, for example, an incorrect airline, airline flight number, aircraft identification number, aircraft type, departure date, departure airport, departure gate, destination airport, arrival gate, departure time, estimated time to complete the flight, arrival time, and the like, and various combinations thereof. Regardless of the source of the error resulting in an invalid flight plan being loaded into the FMS for a flight, any number of undesirable consequences can result when the error is identified. For example, having an incorrect flight plan loaded into the FMS can potentially result in a diversion of the flight, a required landing at an alternate location due to insufficient fuel to reach the planned destination, a landing at an incorrect airport (with consequent landing fees, delay compensation, and unavailability of the aircraft for remaining sectors).

Aspects of the present disclosure relate to providing a method and system for automatically validating at least a portion of a flight plan through a computing device. The computing device can be on-board the aircraft. For example, the computing device can comprise one or more of a Flight Management System (FMS), an Electronic Flight Bag (EFB), an Integrated Modular Avionics (IMA) system, or the like. The computing device can receive a flight plan or an update to at least a portion the flight plan from a pilot. The avionics device can subsequently perform or solicit the execution of a plausibility check of at least a portion of the flight plan to determine whether the flight plan is implausible. As used herein, the term "implausible" or "implausible condition" refers to a flight plan which is determined to contain an error. For example, an implausible flight plan refers to a flight plan in which an error or inconsistency is determined. Conversely, as used herein, a "plausible" flight plan refers to a flight plan in which no errors or inconsistencies have been determined. It will be appreciated that a flight plan having an implausible condition would not be considered a valid flight plan.

In the event that the flight plan is determined to be plausible, the computing device can automatically provide an indication to the pilot and operate the aircraft according to the flight plan. In the event that the flight plan is determined to be implausible, (i.e., contains one or more errors), the avionics device can automatically provide a notification (e.g., an alert) to the pilot, the ATC, or both, of the determination. Additionally, or alternatively, the notification can provide an option to the pilot to update the flight plan to correct the implausible condition, generate a report, notify aviation authorities, or combinations thereof.

The flight plan can be validated, via the computing device, prior to flight to define a valid flight plan which can subsequently be executed via the computing device with minimal intervention required from one of either a flight crew or a pilot. This can allow for an increased efficiency of the flight crew or the pilot of the aircraft because they are no longer required to manually validate the flight plan or portions thereof. Instead, at least a portion of the flight plan can be validated automatically through the avionics device.

All directional references (e.g., radial, axial, upper, lower, upward, downward, left, right, lateral, front, back, top, bottom, above, below, vertical, horizontal, clockwise, counterclockwise) are only used for identification purposes to aid the reader's understanding of the disclosure, and do not create limitations, particularly as to the position, orientation, or use thereof. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to each other. In non-limiting examples, connections or disconnections can be selectively configured to provide, enable, disable, or the like, an electrical connection or communicative connection between respective elements. Furthermore, as used herein, the term "set" or a "set" of elements can be any number of elements.

As used herein, a "controller" or "controller module" can include a component configured or adapted to provide instruction, control, operation, or any form of communication for operable components to affect the operation thereof. A controller module can include any known processor, microcontroller, or logic device, including, but not limited to: Field Programmable Gate Arrays (FPGA), a Complex Programmable Logic Device (CPLD), an Application-Specific Integrated Circuit (ASIC), a Full Authority Digital Engine Control (FADEC), a Proportional Controller (P), a Proportional Integral Controller (PI), a Proportional Derivative Controller (PD), a Proportional Integral Derivative Controller (PID), a hardware-accelerated logic controller (e.g. for encoding, decoding, transcoding, etc.), the like, or a combination thereof. Non-limiting examples of a controller module can be configured or adapted to run, operate, or otherwise execute program code to effect operational or functional outcomes, including carrying out various methods, functionality, processing tasks, calculations, comparisons, sensing or measuring of values, or the like, to enable or achieve the technical operations or operations described herein. The operation or functional outcomes can be based on one or more inputs, stored data values, sensed or measured values, true or false indications, or the like. While "program code" is described, non-limiting examples of operable or executable instruction sets can include routines, programs, objects, components, data structures, algorithms, etc., that have the technical effect of performing particular tasks or implement particular abstract data types. In another non-limiting example, a controller module can also include a data storage component accessible by the processor, including memory, whether transition, volatile or non-transient, or non-volatile memory. Additional non-limiting examples of the memory can include Random Access Memory (RAM), Read-Only Memory (ROM), flash memory, or one or more different types of portable electronic memory, such as discs, DVDs, CD-ROMs, flash drives, Universal Serial Bus (USB) drives, the like, or any suitable combination of these types of memory. In one example, the program code can be stored within the memory in a machine-readable format accessible by the processor. Additionally, the memory can store various data, data types, sensed or measured data values, inputs, generated or processed data, or the like, accessible by the processor in providing instruction, control, or operation to affect a functional or operable outcome, as described herein.

The exemplary drawings are for purposes of illustration only and the dimensions, positions, order and relative sizes reflected in the drawings attached hereto can vary.

FIG. 1 is a schematic illustration of an aircraft 10 and a ground system, such as an ATC 32 that provides an environment for different aspects of the disclosure. The ATC 32 can comprise any type of communicating ATC 32 such as an airline operations center. The ATC 32 can include, or be communicatively coupled with, a second source or computing device. For example, in non-limiting aspects the second source can comprise a destination server 34, an air traffic control and monitoring system 35, an airline management system or database 37, or combinations thereof. In other non-limiting aspects, the second source 34, 35, 37 can comprise any desired source remote from the first computing device 22. For ease of description and understanding, as used herein, the ATC 32 can include any desired source remote from the aircraft 10 such as, but not limited to an ATC, an ACARS, an AOC or combinations thereof.

The aircraft 10 can be configured to fly a route from one location to another (i.e., a flight). The aircraft 10 can include one or more propulsion engines 12 coupled to a fuselage 14. A cockpit 16 can be positioned in the fuselage 14 and wing assemblies 18 can extend outwardly from the fuselage 14. Further, a set of aircraft systems 20 that enable proper operation of the aircraft 10 can be included, as well as one or more controllers or first computing devices 22 (such as a flight computer), and a communication system having a communication link 24. While a commercial aircraft has been illustrated, it is contemplated the aircraft 10 can be any type of aircraft, for example, without limitation, fixed-wing, rotating-wing, personal aircraft, or personal aircraft.

The set of aircraft systems 20 can reside within the cockpit 16, within the electronics and equipment bay (not shown), or in other locations throughout the aircraft 10 including that they can be associated with the propulsion engines 12. Such aircraft systems 20 can include but are not limited to an electrical system, an oxygen system, hydraulics or pneumatics system, a fuel system, a propulsion system, flight controls, audio/video systems, an Integrated Vehicle Health Management (IVHM) system, and systems associated with the mechanical structure of the aircraft 10.

The first computing device 22 can be operably coupled to the set of aircraft systems 20. The first computing device 22 can aid in operating the set of aircraft systems 20 and can receive information from the set of aircraft systems 20 and the ATC 32 via the communication link 24. The first computing device 22 can, among other things, store a flight plan (not shown) for a particular flight of the aircraft 10 and automate the tasks of piloting and tracking the flight in accordance with the flight plan. The first computing device 22 can also be connected with or include other controllers or computers of the aircraft 10 such as, but not limited to, an avionics device, specifically a Flight Management System (FMS) 8. It will be understood that the FMS 8 can be hard-wired to the first computing device 22, or may communicate in any suitable manner with the first computing device 22 including via wireless communication. In non-limiting aspects, the first computing device 22 can include the FMS 8.

During operation, the first computing device 22 can receive information from the FMS 8. For example, the first computing device 22 can run a program for transmitting or receiving flight data. The first computing device 22 can receive data, such as real-time flight data, from one of the set of aircraft systems 20 or sensors on the aircraft 10. In another example, the first computing device 22 can receive data from another aircraft. The program can include a computer program product that can include machine-readable media for carrying or having machine-executable instructions or data structures stored thereon. Such machine-readable media can be any available media, which can be accessed by a general purpose or special purpose computer or other machine with a processor.

Any number of aircraft systems 20, or the like, can be communicatively or operably coupled to the first computing device 22. The aircraft systems 20 can provide or receive information to or from the first computing device 22 based on the operation of the aircraft 10. Additionally, the aircraft 10 can include a user interface such as a display device 27 communicatively coupled to or formed with the first computing device 22. The display device 27 can be any user interface, screen, or known computing device system or combination of computer systems that can communicate or otherwise provide an output to one or more users (e.g., a pilot) of the first computing device 22. For example, the display device 27 can be located in the cockpit 16 of the aircraft 10. It is contemplated that the display device 27 can also obtain or receive input from the one or more users of the first computing device 22.

The communication link 24 can be communicably coupled to the first computing device 22 or other control modules or processors of the aircraft 10 to transfer information to the ATC 32 from the aircraft 10, and to the aircraft 10 from the ATC 32. The communication link 24 can be a conventional hardware device configured to communicate over at least one computer network such as a Virtual Private Network VPN, the Internet, WIFI, satellite network, aircraft data network, aeronautical telecommunications network (ATM), or the like, or a combination thereof. In some aspects, the communication link 24 can include a Network interface Card (NIC) or the like.

It is contemplated that the communication link 24 can be a wireless communication link and can be any variety of communication mechanisms capable of wirelessly linking with other systems and devices and can include, but are not limited to, satellite uplink, SATCOM internet, VHF Data Link (VDL), Aircraft Communications Addressing and Reporting System (ACARS network), Aeronautical Telecommunication Network (ATN), Automatic Dependent Surveillance-Broadcast (ADS-B), Wireless Fidelity (WIFI), WiMax, 3G wireless signal, Code Division Multiple Access (CDMA) wireless signal, Global System for Mobile Communication (GSM), 4G wireless signal, 5G wireless signal, Long Term Evolution (LTE) signal, focused energy (e.g., focused microwave, infrared, visible, or ultraviolet energy), or any combinations thereof. It will also be understood that the particular type or mode of wireless communication is not critical, and later-developed wireless networks are certainly contemplated. Further, the communication link 24 can be communicably coupled with the first computing device 22 through a wired link. Although only one communication link 24 has been illustrated, it is contemplated that the aircraft 10 can have multiple communication links communicably coupled with the first computing device 22. Such multiple communication links can provide the aircraft 10 with the ability to transfer information to or from the aircraft 10 in a variety of ways.

As illustrated, the first computing device 22 can communicate with an external source. Specifically, the first computing device 22 can communicate with the ATC 32 via the communication link 24. The ATC 32 can be a ground facility which can communicate directly with the FMS 8 or any other avionics device communicatively coupled to the aircraft 10. The ATC 32 can be any type of ATC 32 such as one operated by an Air Navigation Service Provider (ANSP). In non-limiting aspects, the air traffic control and monitoring system 35 and the airline management system 37 can communicate with the first computing device 22 via the ATC 32. In non-limiting aspects, the airline management system 37 can comprise, for example, an Airport Stand Guidance system. In non-limiting aspects, the airline management system 37 can additionally or alternatively comprise, for example, an Airline database. The first computing device 22 can request and receive information from the designated ATC 32 or the designated ATC 32 can send information to the aircraft 10. Although illustrated as the ATC 32, it will be appreciated that the aircraft 10 can communicate with any suitable external source such as, but not limited to, an Air Operations Center (AOC), or the like.

The air traffic control and monitoring system 35 and the airline management system 37 can include a computer searchable first database 45 and a computer searchable second database 47, respectively. As illustrated, the first computing device 22 can communicate with a first remote server 30, which can be located anywhere. The communication between the first remote server 30 and the first computing device 22 can be via an external data storage device 31. Non-limiting examples of the external data storage device 31 can include, but is not limited to, hard drives, floppy disks, laptops, Universal Serial Bus (USB) drives, jump drives, mobile devices, CDs, storage arrays, or DVDs. Additionally, or alternatively, the first and second databases 45, 47 can be accessible by the first computing device 22, via the communication link 24. The first computing device 22 can run a set of executable instructions to access the first and second databases 45, 47, respectively and receive data therefrom.

The air traffic control and monitoring system 35 and the airline management system 37 can include respective general-purpose computing devices in the form of a computer, including a processing unit, a system memory, and a system bus, that communicatively couples various system components including the system memory to the processing unit. The system memory can include ROM and RAM. The computer can also include a magnetic hard disk drive for reading from and writing to a magnetic hard disk, a magnetic disk drive for reading from or writing to a removable magnetic disk, and an optical disk drive for reading from or writing to a removable optical disk such as a CD-ROM or other optical media. It will be understood that the first and second databases 45, 47 can be any suitable database, including a single database having multiple sets of data, multiple discrete databases linked together, or even a simple table of data. It is contemplated that the databases 45, 47 can include respective sets of separate databases.

Figure 2:
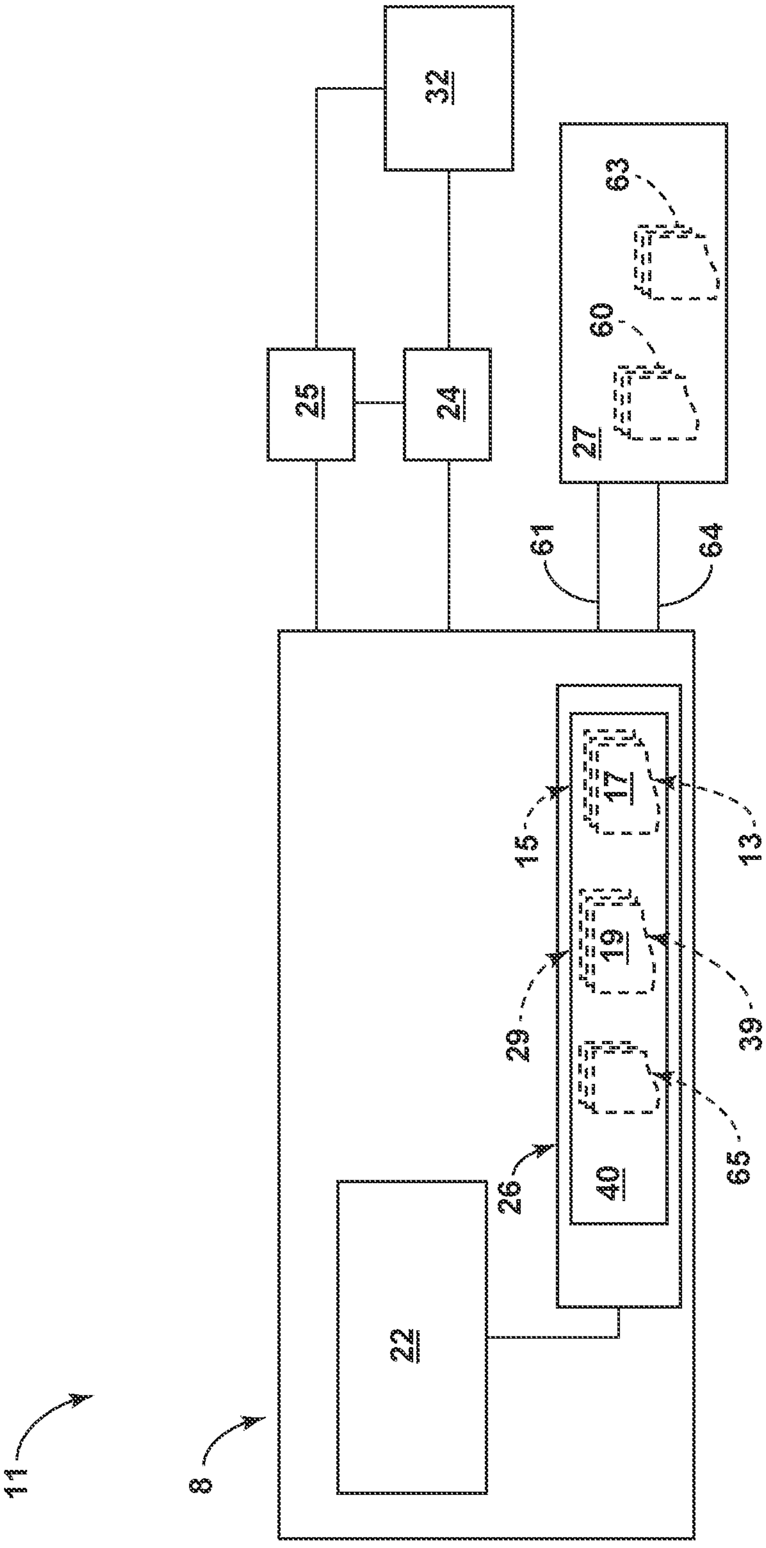
FIG. 2 is a block diagram of a system for validating a flight plan that can be utilized with the aircraft and ground system of FIG. 1, according to aspects described herein.

FIG. 2 illustrates in block-diagram form, a system 11 adapted to validate a flight plan 15 for an aircraft 10, in accordance with non-limiting aspects. The system 11 can include the first computing device 22, which can be communicatively coupled to the FMS 8. The FMS 8 can be communicatively coupled to the ATC 32 via the communication link 24. The FMS 8 can be communicatively coupled to the display device 27. In non-limiting aspects, the display device 27 can be disposed in the cockpit 16 and configured to display a variety of information associated with the flight plan 15. The display device 27 can include an electronic screen, and can also be configured to receive user input via a touchscreen, keyboard, buttons, dials, or other input devices. In non-limiting aspects, the FMS 8 can also be communicatively coupled to an EFB 25. It will be appreciated that the FMS 8 can comprise any suitable onboard avionics or computing device as described herein, and the ATC 32 can be any suitable external device as described herein. The first computing device 22 can further include a memory 26.

The memory 26 can include Random Access Memory (RAM), Read-Only Memory (ROM), flash memory, or one or more different types of portable electronic memory, such as discs, Digital Versatile disks (DVD), Compact Disc-Read-Only Memory (CD-ROMs), etc., or any suitable combination of these types of memory. The computing device 22 can include one or more controller modules or processors, which can be running any suitable programs. It will be understood that the first computing device 22 can include or be associated with any suitable number of individual microprocessors, power supplies, storage devices, interface cards, auto flight systems, flight management computers, controller modules, and other standard components and that the first computing device 22 can include or cooperate with machine executable code, any number of software programs (e.g., flight management programs), or other instructions designed to carry out the various methods, process tasks, calculations, and control/display functions necessary for operation of the aircraft 10.

In non-limiting aspects, the flight plan 15 can be stored in the memory 26. The flight plan 15 can include a set of first flight parameters 17. For example, in non-limiting aspects, the set of first flight parameters 17 can include, without limitation, one or more of a first airline flight number, a first aircraft identification number, a first aircraft model designation or type, a first departure date, a first departure or origin airport, a first departure gate or jetway, a first planned departure time from a first location, a first destination or arrival airport, a first flight time, a first arrival time, a first listing of alternate airports (e.g., for use in the event of bad weather), a first wake turbulence category, a first pilot's name, a first number of passengers onboard, and combinations thereof. It will be appreciated that other aspects are not so limited, and the set of first flight parameters 17 can include any number of predetermined parameters. In non-limiting aspects, the set of first flight parameters 17 can comprise a set of first values 13 and each first value can correspond to a respective first parameters 17.

A database component 40 can be included in the memory 26. It will be understood that the database component 40 can be any suitable database, including a single database having multiple sets of data, multiple discrete databases linked together, or even a simple table of data. It is contemplated that the database component 40 can incorporate a number of databases or that the database can actually be a number of separate databases. The database component 40 can be a Navigation Database (NDB) containing information including, but not limited to, airports, runways, airways, waypoints, terminal areas, navigational aids, airline/company-specific routes, and procedures such as Standard Instrument Departure (SID), and Standard Terminal Approach Routes (STAR). The database component 40 can alternatively include the memory 26 in the FMS 8 containing the flight plan 15.

While not illustrated, it will be understood that any number of systems or computers can also be communicatively or operably coupled to the first computing device 22 to provide information thereto or receive information therefrom.

In non-limiting aspects, the flight plan 15 can be provided or loaded to the memory 26 of the FMS 8 by the pilot of the aircraft 10 to define a loaded flight plan 15. For example, the pilot can input the flight plan 15 into the FMS 8 via the display device 27, such as a touchscreen, keyboard, buttons, dials, or other input devices. In other non-limiting aspects, the flight plan 15 can be loaded to the memory 26 via a portable memory device (not shown) such as a floppy disk, a CD-ROM, a DVD, a PC card, a smart card, and the like.

Additionally, or alternatively, the flight plan 15 and other flight procedure information such as clearances, can be supplied to the aircraft 10 via the communication link 24 from the ATC 32 or any other suitable external source. In other non-limiting aspects, the flight plan 15 can be loaded to the memory 26 of the FMS 8 via the EFB 25. The EFB 25 can be communicatively coupled to the ATC 32 and the communication link 24 such that the flight plan 15, or any updates to at least a portion of the flight plan 15, can be received by or contained within the EFB 25. The EFB 25 can then subsequently upload the flight plan 15 or any updates to the flight plan 15 to the FMS 8 via the communication link 24. The EFB 25 can include a controller module which can be configured to automatically perform the calculations, determinations, executions, and transmissions of the FMS 8. The EFB 25 can be configured to run any suitable programs or executable instructions designed to carry out various methods, functionality, processing tasks, calculations, or the like, to enable or achieve the technical operations or operations described herein. As such, it will be understood that the various operations described herein of validating the flight plan 15 can be done through or via an avionics device, such as the FMS 8, the first computing device 22, the EFB 25 or combinations thereof. As used herein, the phrase "via the avionics device" can be defined as processing or other suitable operations done within the avionics device through the components of the avionics device, or the phrase can alternatively refer to the processing and other suitable operations done external the avionics device in which the avionics device delegated or solicited the external device to perform these operations. The external device can include, for example, the EFB 25.

In aspects, the first computing device 22 can receive a set of data 29 comprising a set of second flight parameters 19 related to the flight plan 15. In aspects, the second set of second flight parameters 19 can collectively define at least a portion of the flight plan 15. In non-limiting aspects, the set of second flight parameters 19 can comprise a set of second values 39. Each second value 39 can correspond to a respective second flight parameter 19. Additionally, for at least a subset of the set of second flight parameters 19, each respective second flight parameter 19 can correspond to a respective first flight parameter 17 of the set of first flight parameters 17. That is, for a valid flight plan 15, each respective second flight parameter 19 should be identical to a corresponding first flight parameter 17 of the set of first flight parameters 17

In non-limiting aspects, since each second flight parameter 19 can comprise a respective second value 39, and since each respective second flight parameter 19 can correspond to a respective first flight parameter 17, it will be appreciated that for a valid flight plan 15, the second value 39 of each respective second flight parameter 19 should be identical to the first value 13 of a corresponding first flight parameter 17

Accordingly, in aspects, each respective second value 39 of each respective second flight parameter 19 can be compared to the respective first value 13 of the corresponding first flight parameter 17 in a one to one comparison to identify any differences therebetween. Further, the comparison of each second flight parameter 19 second value 39 to the respective first value 13 of the corresponding first flight parameter 17 can include verifying whether the respective first and second values 13, 39 are within a predetermined or reasonable or correct range or field. In other words, the comparison can further comprise determining a correctness of data fields and ranges of the first and second values 13, 39. More specifically, in non-limiting aspects, the corresponding subsets of the set of first values 13 and the set of second values 39 can be compared by the FMS 8 to identify any differences therebetween. It will be appreciated that differences identified between the values of corresponding sets of data can be indicative of an error, or risk of an error, in at least one of the sets of data.

In non-limiting aspects, the set of second flight parameters 19 associated with the flight plan 15 can include, without limitation, one or more of the first airline flight number, the first aircraft identification number, the first aircraft model designation or type, the first departure date, the first departure or origin airport, the first departure gate or jetway, the first planned departure time from a second location, the first destination or arrival airport, the first flight time, the first arrival time, the first listing of alternate airports, the first wake turbulence category, the first pilot's name, the first number of passengers onboard, and combinations thereof. It will be appreciated that other aspects are not so limited and the set of second flight parameters 19 can include any number of predetermined parameters.

The set of data 29 can be provided to the computing device 22 from the second source via the ATC 32 and communication link 24. In various non-limiting aspects, the second source can comprise a computing device such as one or more of the destination server 34, the air traffic control and monitoring system 35, the airline management system 37, or combinations thereof. The set of data 29 can be stored in the memory 26.

The FMS 8 can be configured to perform a plausibility check of the flight plan 15. The plausibility check can be based on one or more predetermined rules. The plausibility check can be performed by the FMS 8 based on a comparison of the first values 13 of the set of first flight parameters 17 with the second values 39 of the set of second flight parameters 19. The plausibility check can determine the plausibility of the flight plan 15 based on any difference identified in the comparison of the first values 13 of the set of first flight parameters 17 and the second values 39 of the set of second flight parameters 19. More specifically, the FMS 8 can be configured to compare the set of first values 13 to the second set of values 39. For example, for a particular flight plan 15, the FMS 8 can compare a particular first value 13 of a respective first flight parameter 17 to a corresponding second value 39 of a respective second flight parameter 19, to determine, whether the respective first value 13 is different or otherwise inconsistent with the respective second value 39.

In the event the FMS 8 does not identify any differences, errors, or inconsistencies in the comparison of the first values 13 of the set of first flight parameters 17 and the second values 39 of the set of second flight parameters 19, (i.e., no implausible condition is identified), the flight plan 15 can be determined to be plausible with respect to the compared first and second flight parameters 17, 19. Conversely, in the event the FMS 8 identifies one or more differences, errors, or inconsistencies in the comparison of the first values 13 of the set of first flight parameters 17 and the second values 39 of the set of second flight parameters 19, (i.e., an implausible condition is identified), the flight plan 15 can be determined to be implausible with respect to the compared first and second flight parameters 17, 19.

In one non-limiting illustrative example, the plausibility check can determine if the comparison between the first departure airport and the second departure airport are the same. If the comparison confirms the first departure airport and the second departure airport are the same (i.e., no implausible condition identified), then the flight plan can be determined to be plausible. In another non-limiting example, the FMS 8 can compare the first value 13 of a first flight parameter 17 indicative of a first airline flight number, with the second value 39 of a second flight parameter 19 indicative of a second airline flight number. In such an instance, if the comparison by the FMS 8 determines the first airline flight number (i.e., the first value 13) is equal to, or otherwise consistent with the second airline flight number (i.e., the second value 39), the FMS 8 can determine whether the flight plan 15 is plausible with respect to the airline flight number. However, in such an instance, if the comparison by the FMS 8 determines the first airline flight number (i.e., the first value 13) is not equal to, or is otherwise inconsistent with the second airline flight number (i.e., the second value 39), the FMS 8 can determine whether the flight plan 15 is plausible with respect to the airline flight number.

It is also contemplated that in various non-limiting aspects, the plausibility check can be performed by various avionics devices external to the FMS 8. For example, the plausibility check can be performed by the EFB.

The FMS 8 can be further configured to generate a first notification 60 in the event of a determination that a particular flight plan 15 is implausible. For example, the FMS 8 can provide a first signal 61 to the display device 27 to trigger the first notification 60 to be displayed on the display device 27. In aspects, the first notification 60 can include an alarm or alert indicative of any first flight parameters 17 having a first value 13 that differs from or otherwise does not match or equal a respective second value 39 of the corresponding second flight parameter 19. In non-limiting aspects, the first notification 60 can include a display of the respective first and second values 13, 39 that are determined to have a difference with respect to each other for each corresponding first and second flight parameter 17, 19. In aspects, the first notification 60 can include a visual display (not shown) on the display device 27. The visual display can include a linked list or menu of each first flight parameter 17 having a respective first value 13 that differs from the respective second value 39.

In non-limiting aspects, based on the determination that the flight plan 15 is implausible, FMS 8 can be further configured to additionally or alternatively create a record 65 such as a summary, log entry, or the like. In an aspect, the first controller module 36 can save the record 65 to the memory 26 (e.g., to a log file), and can include predetermined details associated with the plausibility check. The record 65 can include, for example, a set of predetermined details or data fields associated with the flight plan 15, the respective set of first flight parameters 17, the set of first values 13, the set of data 29, the set of second flight parameters 19, the set of second values 39, or combinations thereof. The FMS 8 can be further configured to display the record 65 on the display device 27. The FMS 8 can additionally, or alternatively save the record 65 to the memory 26. It is contemplated that the record 65 can be selectively retrieved from the memory 26 to be used by the by a pilot or other authorized user, for example by air-traffic control personnel or aviation authorities, for subsequent analysis of at least one of the flight plan 15, set of first flight parameters 17, the set of first values 13, the set of second flight parameters 19, or the second set of values 39 or combinations thereof. For example, in non-limiting aspects, the pilot or other authorized user can provide, send, or otherwise convey the record 65 or a copy thereof to aviation authorities, for example, a government authority or regulator (e.g., the FAA, a local municipal authority, or the like) for analysis and review of the aviation data to identify the source of any errors therein.

It is contemplated that in some aspects, the pilot or other authorized user can review the first notification 60 or record 65, or both, and selectively modify respective first values 13 of particular flight parameters 17 accordingly. For example, in some aspects, the first notification 60 can include a prompt or request, (e.g., to the pilot), to check, modify, or update at least a portion of the flight plan 15. It is contemplated that based on the first notification 60, the pilot or authorized user can review the set of first flight parameters 17 or other displayed information. The pilot can choose to accept the flight plan 15, or choose to manually modify or change one or more first values 13 to arrange or configure a plausible modified flight plan 15. For example, the pilot can selectively adjust or modify, without limitation, one or more of the first airline flight number, the first aircraft identification number, the first aircraft type, the first departure date, the first departure or origin airport, the first departure gate or jetway, the first destination airport, the first flight time, the first arrival time, the first listing of alternate airports, the first wake turbulence category, the first pilot's name, the first number of passengers onboard, and combinations thereof. In non-limiting aspects, the pilot or other authorized personnel can then choose to repeat the plausibility check of the flight plan 15, based on the modified first values 13 of the set of first flight parameters 17. The aircraft 10 can then be navigated (e.g., with the FMS 8) based on the modified flight plan 15.

In non-limiting aspects, the FMS 8 can be further configured to generate a second notification 63 in the event of a determination that a particular flight plan 17 is plausible. For example, the FMS 8 can provide a second signal 64 to the display device 27 to trigger the second notification 63 to be displayed on the display device 27. In aspects, the second notification 63 can include a message indicative of the determination that the flight plan 15 is plausible.

Figure 3:
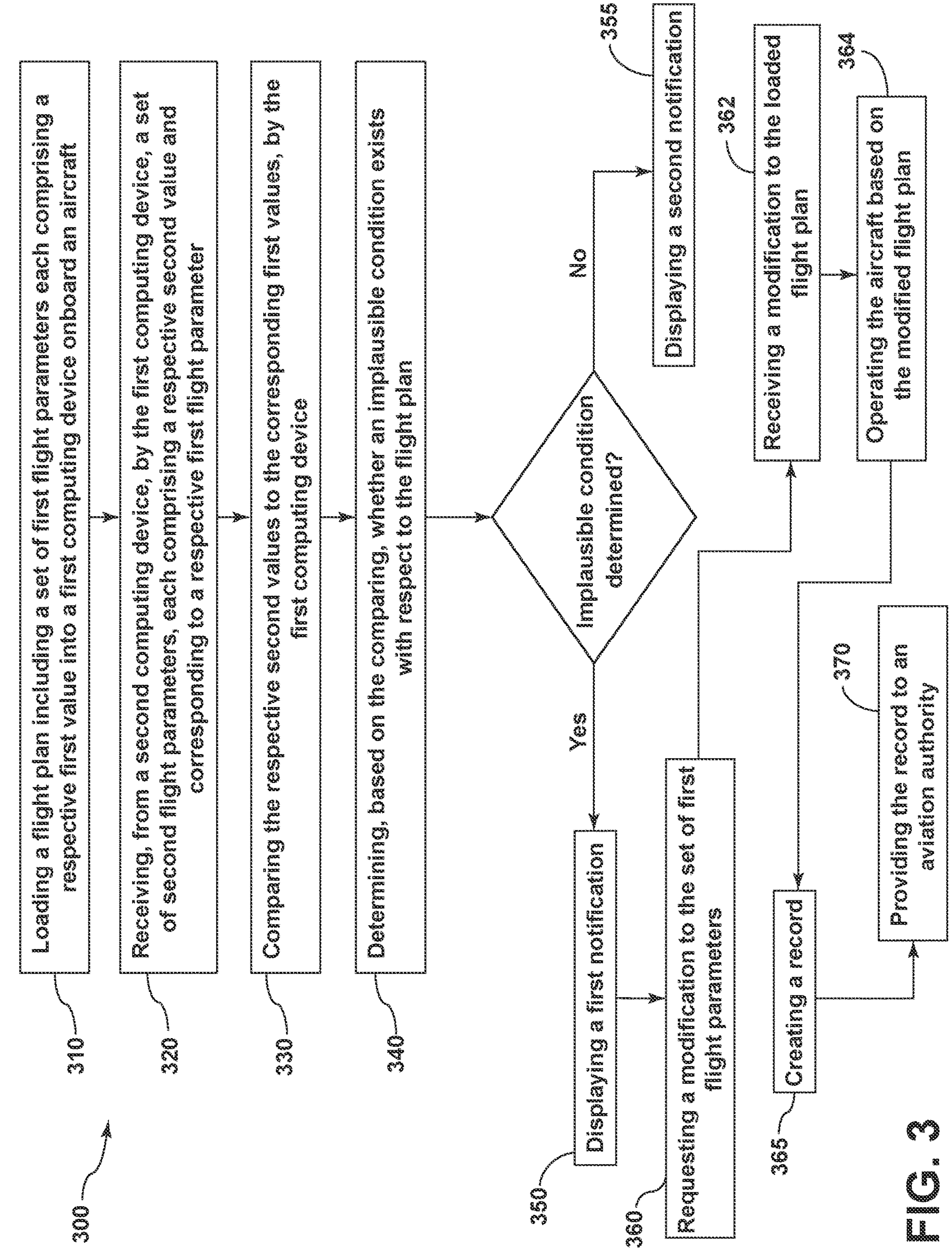
FIG. 3 is a flow chart diagram illustrating a method of validating a flight plan in accordance with aspects described herein.

FIG. 3 illustrates a non-limiting aspect of a method 300 to validate at least a portion of a flight plan 17. Although described in terms of the first computing device 22 and the ATC 32, it will be appreciated that the method 300 can be applied to any suitable avionics device, such as the FMS 8, configured to communicate with any suitable external device.

The method 300 can begin by loading a flight plan 15 (e.g., by a pilot) comprising a set of first flight parameters 17 into a first computing device (e.g., the first computing device 22, or the FMS 8) onboard an aircraft 10, at 310. For example, the set of first flight parameters 17 can include, without limitation, one or more of the first airline flight number, the first aircraft identification number, the first aircraft type, the first departure date, the first departure or origin airport, the first departure gate or jetway, the first destination airport, the first flight time, the first arrival time, the first listing of alternate airports, the first wake turbulence category, the first pilot's name, the first number of passengers onboard, and combinations thereof. It will be appreciated that other aspects are not so limited and the set of first flight parameters 17 can include any number of predetermined parameters. In non-limiting aspects, each first flight parameter 17 can comprise a respective first value 13.

The method 300 includes, at 320 receiving, from a second source 34, 35, 37 at 320, by the first computing device 22, a set of data 29 comprising a set of second flight parameters 19 associated with the flight plan 15. Each second flight parameter 19 can comprise a respective second value 39, and can correspond to a respective first flight parameter 17 of the set of first flight parameters 17.

In non-limiting aspects, the set of second flight parameters 19 can include, without limitation, one or more of the first airline flight number, the first aircraft identification number, the first aircraft type, the first departure date, the first departure or origin airport, the first departure gate or jetway, the first destination airport, the first flight time, a the first arrival time, the first listing of alternate airports, the first wake turbulence category, the first pilot's name, the first number of passengers onboard, and combinations thereof. It will be appreciated that other aspects are not so limited and the set of second flight parameters 19 can include any number of predetermined parameters.

The method 300 can include comparing, by the computing device 22, the respective second values 39 of the set of second flight parameters 19 with the corresponding first values 13 of the set of first flight parameters 17, at 330. The computing device 22 can be configured to compare the set of first values 13 to the set of second values 39. For example, for a particular flight plan 15, the first computing device 22 can compare a particular first value 13 of a respective first flight parameter 17 to a corresponding second value 39 of a respective second flight parameter 19, The method 300 can further include performing, via the first computing device 22, a plausibility check of the flight plan 15 based on the comparing to identify an implausible condition. The plausibility check can comprise determining, at 340, based on the comparing, whether an implausible condition exists with respect to the flight plan. In non-limiting aspects, an implausible condition can be considered or determined to exist when a particular first value 13 of a respective first flight parameter 17 is different or otherwise inconsistent with the respective second value 39 of a corresponding second flight parameter 19. The first computing device 22 can determine, based on the comparison, that an implausible condition does not exist (i.e., a particular flight plan 15 is plausible) when the first computing device 22 determines no differences in the data (e.g., errors) based on the comparing.

In one non-limiting example of method 300, the comparing by the first computing device 22 the respective second values 39 of the set of second flight parameters 19 with the corresponding first values 13 of the set of first flight parameters 17 for a particular flight plan 15 can include comparing the first value 13 of a first flight parameter 17 indicative of a first aircraft model designation (e.g., 777) to the second value 39 of a second flight parameter 19 indicative of a second aircraft model designation. In such an instance, if the comparing by the first computing device 22 determines the first aircraft model designation (i.e., the first value 13) is equal to, or otherwise consistent with the second aircraft model designation (i.e., the second value 39), the first computing device 22 can determine the particular flight plan 15 is plausible (i.e., an implausible condition is not identified) with respect to the aircraft model designation. However, in such an instance, if the comparison by the first computing device 22 determines the first aircraft model designation (i.e., the first value 13) is not equal to, or is otherwise inconsistent with the second aircraft model designation (i.e., the second value 39), the computing device can determine flight plan 15 is implausible with respect to the aircraft model designation (i.e., an implausible condition is identified).

The method 300 can include, in the event that an implausible condition with respect to the flight plan 15 is determined, displaying a first notification 60 at 350. For example, the displaying a first notification 60 can include can providing, by the first computing device 22, a first signal 61 to a display device 27 to trigger the first notification 60 to be displayed on the display device 27. In aspects, the displaying the first notification 60 can include generating an alarm or alert indicative of any first flight parameters 17 having a first value 13 that differs from or otherwise does not match or equal a respective second value 39 of the corresponding second flight parameter 19. In non-limiting aspects, the displaying the first notification 60 can include displaying the respective first and second values 13, 39 that are determined to have a difference with respect to each other for each corresponding first and second flight parameters 17, 19. In aspects, the displaying the first notification 60 can include a providing a visual display (not shown) on the display device 27. In non-limiting aspects, the display device 27 can be disposed in the cockpit of the aircraft 10.

In non-limiting aspects, in the event that an implausible condition with respect to the flight plan 15 is determined, the method 300 can include requesting, by the first computing device 22 a modification to a first value 13 of the set of first flight parameters 17, at 360. It is contemplated that in some aspects, in response to the requesting, the pilot or other authorized user can review the first notification 60 or record 65, or both. The method 300 can include, at 362 receiving a modification to the set of first flight parameters 17 (i.e., the first flight plan 15) in response to the first notification 60. In response to the received modification, the first computing device 22 can be configured to selectively modify one or more respective first values 13 of particular flight parameters 17 of the flight plan 15. In non-limiting aspects, the pilot can choose to either accept the flight plan 15 without modification, or manually modify or change one or more first values 13 to arrange or configure a plausible flight plan 15. In non-limiting aspects, for example, can selectively adjust or modify, without limitation, one or more of the first airline flight number, the first aircraft identification number, the first aircraft type, the first departure date, the first departure or origin airport, the first departure gate or jetway, the first destination airport, the first flight time, the first listing of alternate airports, the first wake turbulence category, the first pilot's name, the first number of passengers onboard, and combinations thereof. In non-limiting aspects, the pilot or other authorized personnel can then choose to repeat the plausibility check of the flight plan 15, based on the modified first values 13 of the set of first flight parameters 17. The method 300 can then include operating or navigating the aircraft 10 based on the selectively modified flight plan 15.

In non-limiting aspects, the method 300 can further include, in the event that an implausible condition with respect to the flight plan 15 is determined, creating a record 65 such as a summary, log entry, or the like by the first computing device 22, at 365. In an aspect, the creating a record can include saving the record 65 to the memory 26 (e.g., to a log file). The record 65 can include predetermined details associated with the plausibility check, such as a set of predetermined details or data fields associated with the flight plan 15, the respective set of first flight parameters 17, the set of first values 13, the set of data 29, the set of second flight parameters 19, the set of second values 39, or combinations thereof. In aspects, the record 65 can include information indicative of the implausible condition such as an indication of the first or second flight parameters 17, 19 which were determined to be implausible. The creating a record can further include displaying the record 65 on the display device 27.

The method 300 can also include, in the event that an implausible condition with respect to the flight plan 15 is determined, providing or sending the record 65 to an aviation authority at 370. For example, the providing the record 65 can include sending the record 65 to a predetermined aviation authority for subsequent analysis of at least one of the flight plan 15, set of first flight parameters 17, the first set of values 13, the set of second flight parameters 19, or the second set of values 39 or combinations thereof. In non-limiting aspects, the sending a message to an aviation authority can comprise providing, sending, or otherwise conveying the record 65 or a copy thereof, by the first computing device 22, the pilot or other authorized user, to aviation authorities, for example, a government authority or regulator (e.g., the FAA, a local municipal authority, or the like).

In non-limiting aspects, in the event that an implausible condition with respect to the flight plan 15 is not determined (i.e., the flight plan 15 is plausible), the method 300 can include displaying a second notification 63. For example, the displaying a second notification 63 can include providing, by the first computing device 22, a second signal 62 to the display device 27 to trigger the second notification 63 to be displayed on the display device 27. In aspects, the second notification 63 can include information indicative of the determination that the flight plan 15 is plausible.

The sequences depicted are for illustrative purposes only and is not meant to limit the method 300 in any way as it is understood that the portions of the method can proceed in a different logical order, additional or intervening portions can be included, or described portions of the method can be divided into multiple portions, or described portions of the method can be omitted without detracting from the described method. For example, the method 300 can include various other intervening steps. The examples provided herein are meant to be non-limiting.

It is contemplated that aspects of this disclosure can be advantageous for use over or in conjunction with conventional systems or methods for validating the flight plan of the aircraft. Specifically, advantages can allow for more freedom of time for the flight crew or the pilot when compared to conventional validating methods (e.g., the flight crew or the pilot is not to be bogged down with checking the flight plan manually). Moreover, aspects as disclosed herein automatically avoids errors that can be made when performing such manual validating, and can further identify errors made in the original flight plan itself. For example, conventional validating methods can require that the pilot or the flight crew manually perform the validation of the flight plan. Specifically, conventional validating methods can require the pilot or the flight crew manually review the flight plan and manually authenticate the flight plan. This can be very time consuming and take the flight crew or the pilot away from other tasks that need to be performed to operate the aircraft. Additionally, this manual review can be subject to human error by a pilot or flight crew. For example, the pilot can load an incorrect or invalid flight plan into the FMS. Even when a pilot manually reviews the flight plan, the same error can be repeated. The method disclosed herein, however, does not require intensive manual interactions from the flight crew or the pilot, in fact, the methods described herein can in some instances not require any interaction from the flight crew or the pilot at all. The methods described herein can receive, and validate the flight plan automatically according to data received from an external source. All of this can be done without any intervention from the flight crew or the pilot. This, in turn, frees up time with the pilot or the flight crew and reduces risks associated with human error In some instances, the aircraft utilizing the method described herein can be defined as an aircraft with a single person operation.

To the extent not already described, the different features and structures of the various embodiments can be used in combination with each other as desired. That one feature is not illustrated in all of the aspects is not meant to be construed that it may not be, but is done for brevity of description. Thus, the various features of the different aspects may be mixed and matched as desired to form new aspects, whether or not the new aspects are expressly described. All combinations or permutations of features described herein are covered by this disclosure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Various characteristics, aspects and advantages of the present disclosure may also be embodied in any permutation of aspects of the disclosure, including but not limited to the following technical solutions as defined in the enumerated aspects:

A method for validating a flight plan having a set of first flight parameters comprising respective first values and stored on a first computing device onboard an aircraft, the method comprising: receiving the flight plan into the first computing device onboard the aircraft to define a loaded flight plan; receiving, by the first computing device, from a second source remote from the aircraft, a set of data comprising a set of second flight parameters having respective second values and corresponding to the set of first flight parameters; comparing the respective first values of the set of first flight parameters in the loaded flight plan to the respective second values of the corresponding set of second flight parameters by the first computing device; determining, based on the comparing, whether an implausible condition exists with respect to the loaded flight plan; and when an implausible condition is determined, automatically displaying a first notification on a display device, requesting, by the first computing device, a modification to the set of first flight parameters; modifying the loaded flight plan based on the notification; and operating the aircraft in accordance with the modified loaded flight plan.

The method of the preceding clause, wherein the first notification is displayed onboard the aircraft.

The method of any preceding clause, further comprising automatically sending a record from the first computing device to a predetermined aviation authority when an implausible condition is determined.

The method of any preceding clause, wherein the first computing device comprises a flight management system (FMS).

The method of any preceding clause, wherein the second source comprises an airline database.

The method of any preceding clause, wherein the second source includes an airport Stand Guidance system.

The method of any preceding clause, wherein the set of first flight parameters includes a first flight number of the aircraft.

The method of any preceding clause, wherein the set of first flight parameters includes a first planned arrival time.

The method of any preceding clause, wherein the set of first flight parameters includes a first departure location of the aircraft.

The method of any preceding clause, wherein the set of first flight parameters includes a first planned departure time of the aircraft.

The method of any preceding clause, wherein the set of first flight parameters includes a first flight number of the aircraft and a first model designation of the aircraft.

A system adapted to verify a flight plan comprising a set of first flight parameters having respective first values for an aircraft, the system comprising: a first computing device onboard the aircraft; a display device communicatively coupled to the first computing device; the first computing device configured to: receive the flight plan; receive, from a second source remote from the aircraft, a set of data comprising a set of second flight parameters having respective second values and corresponding to the set of first flight parameters; compare the respective first values of set of first flight parameters to the respective second values of the corresponding set of second flight parameters by the first computing device; determine, based on the comparing, whether an implausible condition exists with respect to the received flight plan; and when an implausible condition is determined, automatically display a first notification on the display device request a modification to the set of first flight parameters; receive a modification to the set of first flight parameters based on the first notification; and operate the aircraft in accordance with the modified first flight parameters.

The system of any preceding clause, wherein the display device is disposed onboard the aircraft.

The system of any preceding clause, wherein the first computing device is further configured, when an implausible condition is determined to exist, to automatically send a record to a predetermined aviation authority.

The system of any preceding clause, wherein the first computing device comprises an FMS.

The system of any preceding clause, wherein the second source comprises an airline database.

The system of any preceding clause, wherein the second source includes an airport Stand Guidance system.

The system of any preceding clause, wherein the set of first flight parameters includes a first flight number of the aircraft, and a first planned departure time.

The system of any preceding clause, wherein the set of first flight parameters includes a first planned departure time of the aircraft.

The system of any preceding clause, wherein the set of first flight parameters includes a first planned arrival time.

What is claimed is:

1. A method for validating, with a first computing device onboard an aircraft, a flight plan having a set of first flight parameters comprising respective first values, the method comprising:

receiving the flight plan into the first computing device to define a loaded flight plan;

receiving, by the first computing device, from a second source remote from the aircraft, a set of data comprising a set of second flight parameters having respective second values and corresponding to the set of first flight parameters;

comparing the respective first values of the set of first flight parameters in the loaded flight plan to the respective second values of the corresponding set of second flight parameters by the first computing device;

determining, based on the comparing, whether an implausible condition exists with respect to the loaded flight plan; and when an implausible condition is determined, automatically displaying a notification on a display device;

requesting, by the first computing device, a modification to the set of first flight parameters;

receiving a modification to the loaded flight plan in response to the notification; and navigating the aircraft based on the modification to the loaded flight plan;

wherein an implausible condition is determined to exist when a particular first value of a respective flight parameter is different or otherwise inconsistent with the respective second value of a corresponding second flight parameter.

2. The method of claim 1, further comprising automatically sending a record from the first computing device to a predetermined aviation authority when an implausible condition is determined, wherein the record comprises a set of predetermined data fields associated with the flight plan.

3. The method of claim 1, wherein the first computing device comprises a flight management system (FMS).

4. The method of claim 1, wherein the second source comprises an airline database.

5. The method of claim 1, wherein the second source includes an airport Stand Guidance system.

6. The method of claim 1, wherein the set of first flight parameters includes a first flight number of the aircraft.

7. The method of claim 6, wherein the set of first flight parameters includes a first planned arrival time.

8. The method of claim 1, wherein the set of first flight parameters includes a first departure location of the aircraft.

9. The method of claim 1, wherein the set of first flight parameters includes a first planned departure time of the aircraft.

10. The method of claim 1, wherein the set of first flight parameters includes a first flight number of the aircraft and a first model designation of the aircraft.

11. A system adapted to verify a flight plan comprising a set of first flight parameters having respective first values for an aircraft, the system comprising:

a first computing device onboard the aircraft;

a display device communicatively coupled to the first computing device;

the first computing device configured to:

receive the flight plan;

receive, from a second source remote from the aircraft, a set of data comprising a set of second flight parameters having respective second values and corresponding to the set of first flight parameters;

compare the respective first values of set of first flight parameters to the respective second values of the corresponding set of second flight parameters by the first computing device;

determine, based on the comparing, whether an implausible condition exists with respect to the received flight plan; and when an implausible condition is determined, display a first notification on the display device;

request a modification to the set of first flight parameters;

receive a modification to the set of first flight parameters based on the first notification, and navigate the aircraft in accordance with the modification to the set of first flight parameters;

wherein an implausible condition is determined to exist when a particular first value of a respective first flight parameter is different or otherwise inconsistent with the respective second value of a corresponding second flight parameter.

12. The system of claim 11, wherein the first computing device is further configured, when an implausible condition is determined to exist, to automatically send a record to a predetermined aviation authority, wherein the record comprises a set of predetermined data field with the flight plan.

13. The system of claim 11, wherein the first computing device comprises an FMS.

14. The system of claim 11, wherein the second source comprises an airline database.

15. The system of claim 11, wherein the second source includes an airport Stand Guidance system.

16. The system of claim 11, wherein the set of first flight parameters includes a first flight number of the aircraft.

17. The system of claim 11, wherein the set of first flight parameters includes a first planned departure time of the aircraft.

18. The system of claim 11, wherein the set of first flight parameters includes a first planned arrival time of the aircraft.

* * * * *